United States Patent
Jin et al.

(10) Patent No.: US 12,259,164 B2
(45) Date of Patent: Mar. 25, 2025

(54) CHECK VALVE AND AIR CONDITIONER HAVING SAME

(71) Applicant: ZHEJIANG DUNAN ARTIFICIAL ENVIRONMENT CO., LTD., Shaoxing (CN)

(72) Inventors: Huahai Jin, Shaoxing (CN); Yongbin Xuan, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 21 days.

(21) Appl. No.: 18/216,605

(22) Filed: Jun. 30, 2023

(65) Prior Publication Data

US 2023/0341157 A1  Oct. 26, 2023

Related U.S. Application Data

(63) Continuation of application No. PCT/CN2022/070641, filed on Jan. 7, 2022.

(30) Foreign Application Priority Data

Jan. 8, 2021 (CN) .......................... 202120055212.5

(51) Int. Cl.
*F25B 41/20* (2021.01)
*F16K 15/02* (2006.01)

(52) U.S. Cl.
CPC ............ *F25B 41/20* (2021.01); *F16K 15/021* (2013.01)

(58) Field of Classification Search
CPC ........ F25B 41/20; F25B 41/26; F16K 15/021; F16K 27/0209
See application file for complete search history.

(56) References Cited

U.S. PATENT DOCUMENTS

| | | | | |
|---|---|---|---|---|
| 2,609,175 | A | * 9/1952 | Von Kokeritz | ..... F16K 27/0209 251/363 |
| 3,408,040 | A | * 10/1968 | Kraft | ................ F16K 31/52408 251/263 |
| 5,829,952 | A | * 11/1998 | Shadden | ............... F16K 15/021 417/547 |

FOREIGN PATENT DOCUMENTS

| | | |
|---|---|---|
| CN | 204512548 U | 7/2015 |
| CN | 205064939 U | 3/2016 |
| CN | 205350450 U | 6/2016 |
| CN | 205350450U X | 6/2016 |
| CN | 208058043 U | 11/2018 |
| CN | 209800802 U | 12/2019 |

(Continued)

OTHER PUBLICATIONS

International Search Report of PCT/CN2022/070641.
European search report of EP22736579.8.

*Primary Examiner* — Patrick C Williams

(57) ABSTRACT

A check valve and an air conditioner having the same are provided. The check valve includes a valve body, a valve cover and a valve core. The valve body is provided with a valve cavity and a valve port. The valve core is located in the valve cavity and configured to open or close the valve port. The valve cover is covered on the valve body and configured for limiting the valve core from separating from the valve cavity along an axis of the valve body. The valve cover is provided with a stop rod, or an end of the valve body adjacent to the valve cover is provided with a stop rod. The valve core is provided with a limiting portion, and the limiting portion is configured for matching with the stop rod to circumferentially limit the valve core.

10 Claims, 6 Drawing Sheets

(56) References Cited

FOREIGN PATENT DOCUMENTS

| | | |
|---|---|---|
| CN | 113653838 A | 11/2021 |
| CN | 214946604 U | 11/2021 |
| CN | 215110702 U | 12/2021 |
| JP | 2013044418 A | 3/2013 |

* cited by examiner

CHECK VALVE AND AIR CONDITIONER HAVING SAME

CROSS-REFERENCE TO RELATED APPLICATION

This application is a continuation of international patent application No. PCT/CN2022/070641, filed on Jan. 7, 2022, which itself claims priority to Chinese patent application No. 202120055212.5, and titled "CHECK VALVE AND AIR CONDITIONER HAVING SAME", filed on Jan. 8, 2021. The content of the above identified applications is hereby incorporated herein in their entireties by reference.

TECHNICAL FIELD

The present disclosure relates to the field of valve, in particular, to a check valve and an air conditioner having the same.

BACKGROUND

A check valve is a kind of valve in which a medium flows in only one direction and cannot flow in an opposite direction. The check valve is provided in pipings of a hydraulic circuit or a refrigeration circulation system, and the like, to prevent reverse flow of the medium.

In a check valve of the conventional art, a valve core is capable of moving in the valve body to open or close the check valve. The valve core is capable of rotating freely in the valve body. Since the valve core rotates in the valve body under the action of a medium in the valve body, noises are generated.

SUMMARY

In view of this, the present disclosure provides a check valve.

In order to solve the technology problems above, the present disclosure provides the following technical solutions.

A check valve includes a valve body, a valve cover and a valve core. The valve body is provided with a valve cavity and a valve port. The valve core is located in the valve cavity and capable of moving in the valve cavity to open or close the valve port. The valve cover is covered on the valve body and configured for limiting the valve core from separating from the valve cavity along an axis of the valve body. A stop rod is provided on the valve cover, or an end of the valve body adjacent to the valve cover. The valve core is provided with a limiting portion, and the limiting portion is configured for matching with the stop rod to circumferentially limit the valve core.

In this way, the valve core can be circumferentially limited. Thus, the valve core can be prevented from rotating in the process of moving along the axis of the check valve, so that noises caused by collision between the valve core and the inner wall of the valve body or the valve cover when the valve core rotates can be avoided.

In some embodiments, the valve core is provided with a plurality of limiting portions. The plurality of limiting portions are arranged along a circumference of the valve core. The stop rod extends through any two of the plurality of limiting portions and is configured for abutting against sidewalls of the two of the plurality of limiting portions.

In this way, not only rotation of the valve core in an anticlockwise direction can be limited, but also rotation of the valve core in a clockwise direction can be limited.

In some embodiments, the valve core is provided with three limiting portions. Accommodating areas are defined between any two of the three limiting portions along a circumference of the valve core. An end of the stop rod is located in one of the accommodating areas, and the other end of the stop rod extends to and is located in another one of the accommodating areas.

In this way, on the premise that rotation of the valve core both in the clockwise direction and the anticlockwise direction can be limited, the number of the limiting portion can be controlled, so that the number of the limiting portion will not be too great and the limiting portion will not occupy much of a volume of the valve cavity, and the flowing performance of the medium will not be influenced.

In some embodiments, an axis of the stop rod is perpendicular to an axis of the check valve.

In this way, on the premise that the stop rod can match with any two limiting portions, a length of the stop rod can be shortened and a mounting area can be saved.

In some embodiments, an axis of the stop rod is collinear with a center line of an end surface of the valve cover adjacent to the stop rod.

In this way, the stop rod can match with any two limiting portions.

In some embodiments, the valve cover is provided with a limiting groove. An inner wall of the end of the valve body adjacent to the valve cover is provided with a limiting step, and the stop rod is located in the limiting groove and abuts against the limiting step.

In this way, the stop rod can be fixed.

In some embodiments, an inner wall of the end of the valve body adjacent to the valve cover is provided with a limiting step. The limiting step is provided with a limiting groove. The stop rod is located in the limiting groove and abuts against an end surface of the valve cover adjacent to the valve body.

In this way, the stop rod can be fixed.

In some embodiments, the limiting portion comprises a wing plate and a tail plate. The tail plate is disposed on the wing plate, an end of the tail plate adjacent to the valve cover protrudes out from the valve core, so that the stop rod can match with a sidewall of the tail plate.

In this way, the valve core can be limited along the axis of the valve core.

In some embodiments, a side of the limiting portion extends towards an inner wall of the valve body and protrudes out from a sidewall of the valve core, and a flow channel is defined between adjacent two limiting portions.

In this way, the medium can flow through the check valve.

In some embodiments, a cross section of the stop rod is circle-shaped, tetragon-shaped, or triangle-shaped.

The present disclosure further provides a following technical solution: an air conditioner including the check valve disclosed above.

Compared with a check valve in the related art, in the check valve of the present disclosure, a stop rod is disposed on the valve cover or the valve body, and a limiting portion is provided on the limiting portion. By cooperating between the stop rod and the limiting portion, the valve core can be circumferentially limited. Therefore, noise caused by collision between the valve core and an inner wall of a valve body and a valve cover when the valve core moves along the axis of the valve core can be avoided.

In the figures, 100 represents a check valve; 10 represents a valve body; 11 represents a valve cavity; 12 represents a first connection pipe; 13 represents a second connection pipe, 14 represents a valve port; 15 represents a limiting step; 20 represents a valve cover; 21 represents a stop rod; 22 represents a limiting groove; 40 represents a valve core; 41 represents a limiting portion; 411 represents a wing plate; 412 represents a tail plate; 413 represents a second step; 414 represents an accommodating area; 415 represents a flow channel, 42 represents a sealing surface; and 200 represents an air conditioner.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, but not all of them. Based on the embodiments in this disclosure, all other embodiments obtained by a person of ordinary skill in the art without making creative labor fall within the scope of protection of this disclosure.

It should be noted that when a component is said to be "disposed" on another component, it may be directly disposed on the other component or there may be a centered component. When a component is considered to be "located" on another component, it may be directly located on the other component or there may be both centered components. When a component is considered to be "fixed" to another component, it may be fixed directly to the other component or there may be a centered component as well.

Unless otherwise defined, all technical and scientific terms used herein have the same meaning as commonly understood by those of skill in the art belonging to the present disclosure. The terms used herein in the specification of this disclosure are for the purpose of describing specific embodiments only and are not intended to limit this disclosure. The term "or/and" as used herein includes any and all combinations of one or more of the relevant listed items.

Referring to FIG. 1 to FIG. 6, the present disclosure provides a check valve 100. The check valve 100 can be configured for preventing backflow of a refrigerating agent in an air conditioner 200, preventing reverse flow of oil in a hydraulic system, or preventing reverse flow of compressed air in an air-operated system.

Figure 1:
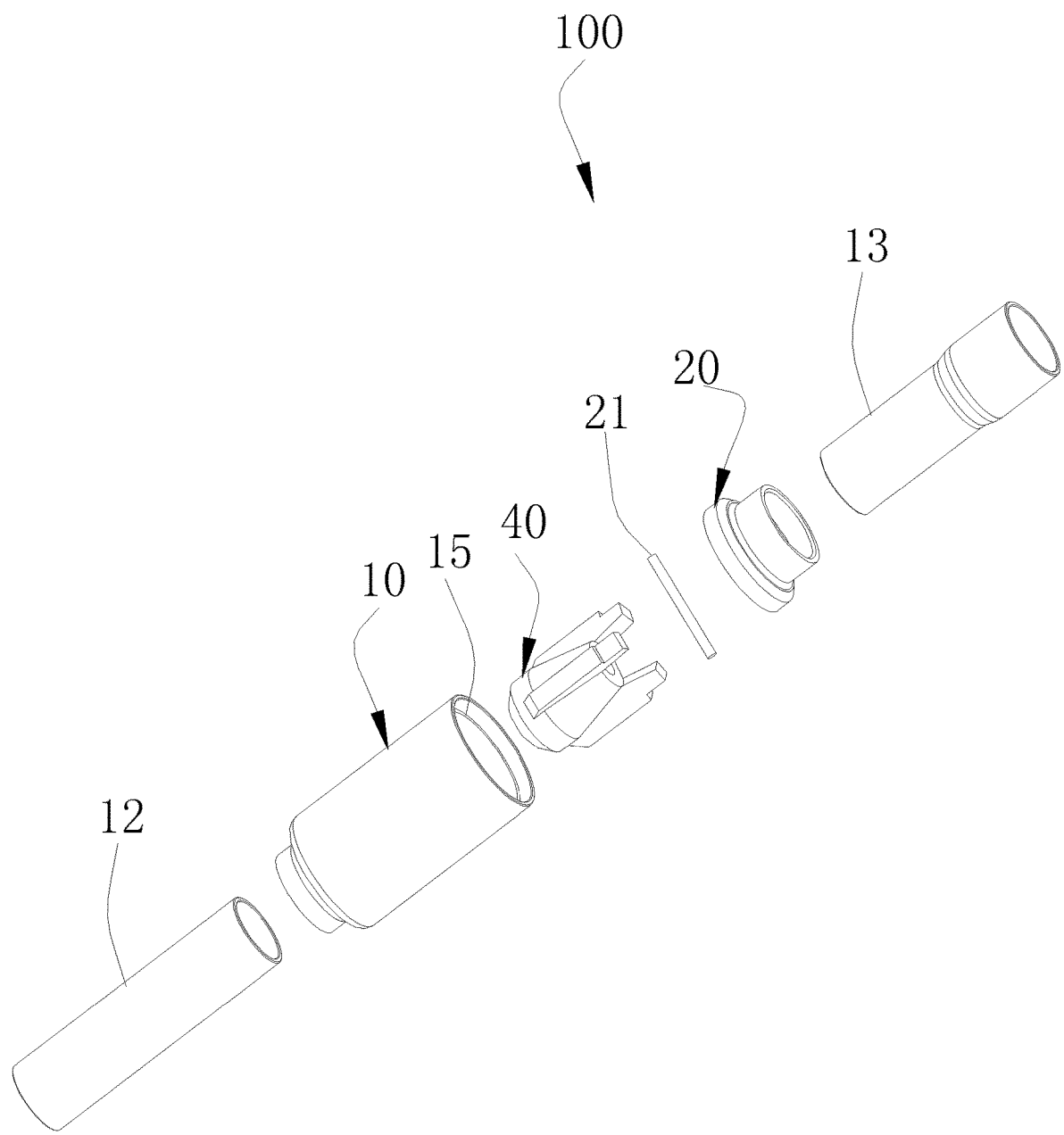
FIG. 1 is an exploded view of a check valve in an embodiment of the present disclosure.
Figure 2:
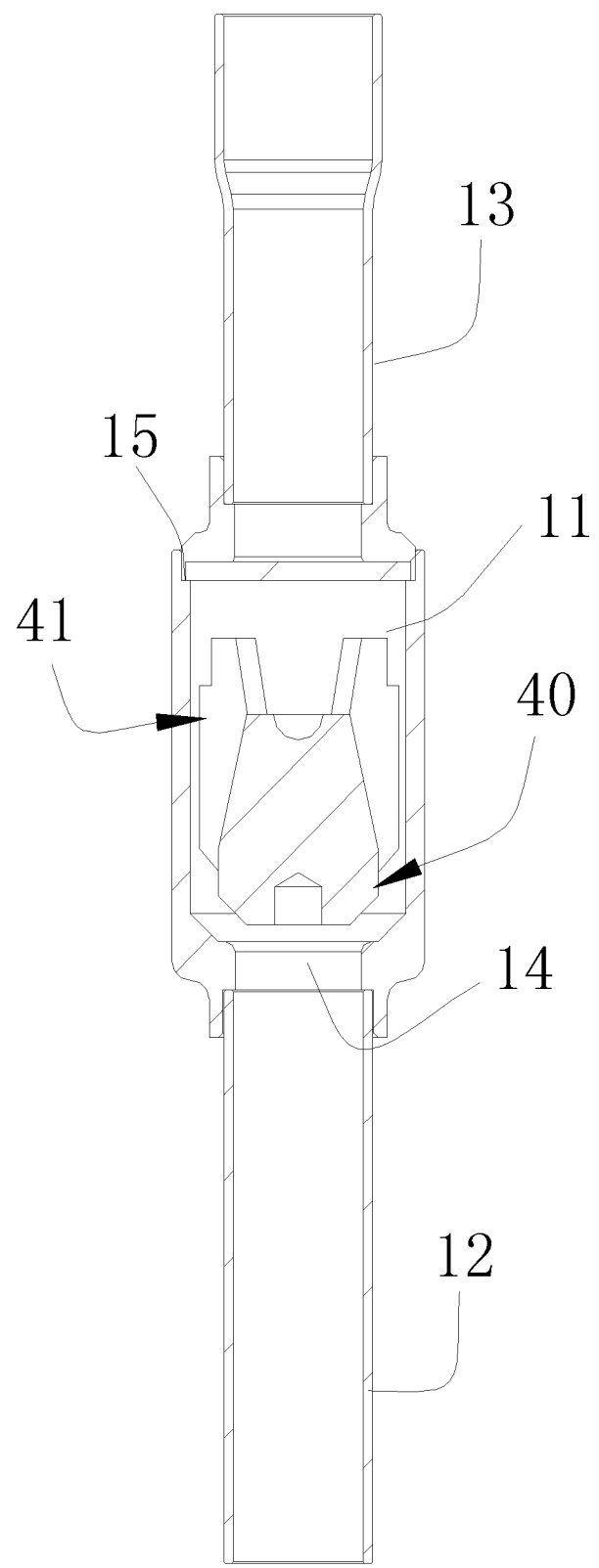
FIG. 2 is a structural schematic diagram of a sectional view of a check valve in an embodiment of the present disclosure.

Referring to FIG. 1 and FIG. 2, specifically, the check valve 100 of the present disclosure includes a valve body 10, a valve cover 20 and a valve core 40. The valve body 10 includes a valve cavity 11. The valve body 10 is provided with a valve port 14. The valve core 40 is located in the valve cavity 11 and capable of moving in the valve cavity 11 to open or close the valve port 14. The valve cover 20 is covered on the valve body 10 and configured for limiting the valve core 40 from separating from the valve cavity 11 along an axis of the valve body 10.

Both ends of the valve body 10 are provided with a first connection pipe 12 and a second connection pipe 12. Both a diameter of the first connection pipe 12 and a diameter of the second connection pipe 12 are not less than a diameter of the valve body 10. The valve cover is in a hollow-shaped structure with two opening at both ends. The first connection pipe 12 is connected to and in communication with an end of the valve body away from the valve cover 20. The second connection pipe is connected to and in communication with the valve cover 20. In addition, the valve body 10 and the first connection pipe 12 can be integrally formed or separately formed and connected with each other, and the valve cover 20 and the second connection pipe 13 can be integrally formed or separately formed and connected with each other.

In some embodiments, the valve is tubular-shaped and in a hollow-shaped structure. In the present embodiment, the valve body is made of cast copper. In some embodiment, the valve body can be made of materials such as iron and the like, which are not limited herein.

A stop rod 21 is provided on the valve cover 20, or an end of the valve body 10 adjacent to the valve cover 20. The valve core 40 is provided with a limiting portion 41, and the limiting portion 41 is configured for matching with the stop rod 21 to circumferentially limit the valve core 40.

It should be noted that in related art, the valve core moves in the valve body to open or close the check valve. The valve core is capable of rotating freely in the valve body. Since the valve core rotates in the valve body under the action of a medium in the valve body, noises are generated.

In the present embodiment, by matching between the stop rod 21 and the limiting portion 41, the valve core 40 can be circumferentially limited. Therefore, noise caused by collision between the valve core 40 and an inner wall of a valve body 10 and a valve cover 20 when the valve core 40 rotates can be avoided. It should be noted that in the present embodiment, the check valve 100 is a gravity-held check valve in which the valve port 14 is sealed by gravity of the valve core 40 to prevent the medium from reversely flowing. Therefore, only when the check valve 100 is longitudinally disposed, the check valve 100 can achieve the effect of monodirectional flow. It should be noted that in the present disclosure, the medium represents a flow that flows through the check valve 100. In the present embodiment, the medium is a refrigerating agent. In some embodiments, the medium can be compressed air, and the like.

Figure 3:
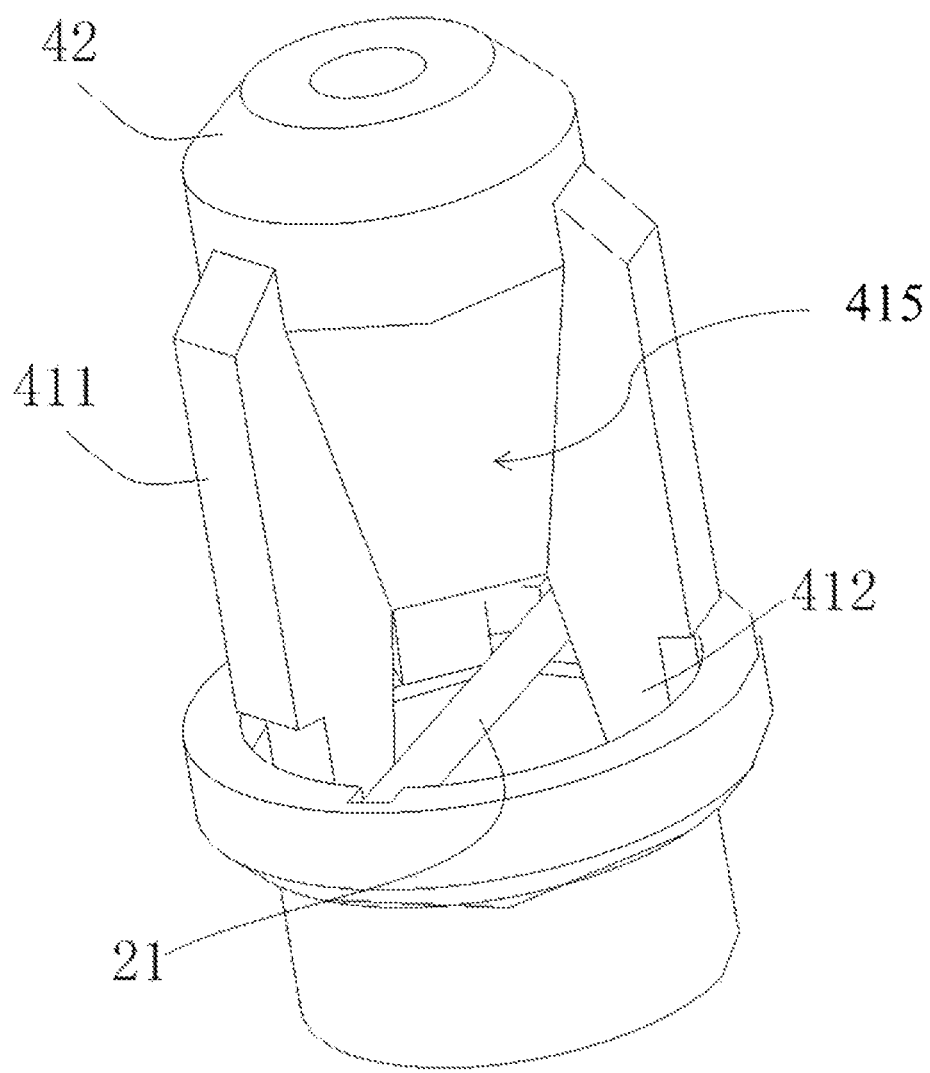
FIG. 3 is a structural schematic diagram of a valve core and a valve cover in an embodiment of the present disclosure.
Figure 4:
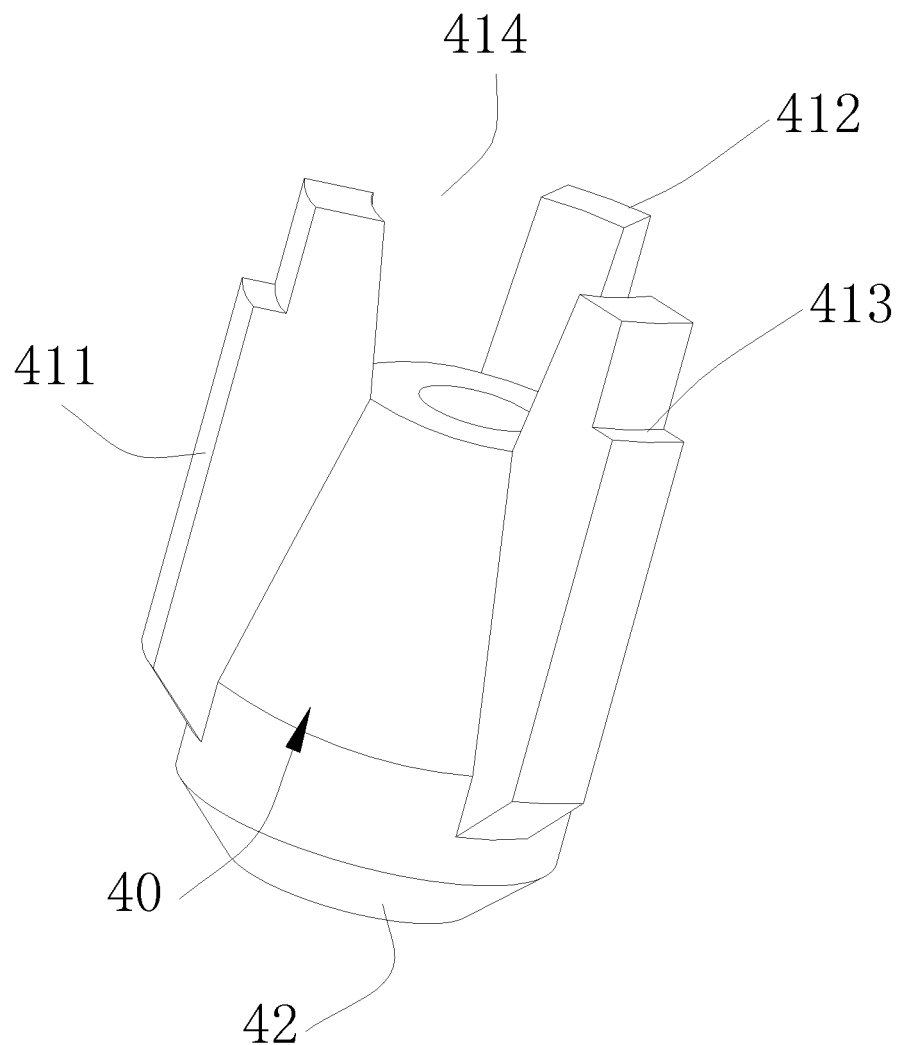
FIG. 4 is a structural schematic diagram of a valve core in an embodiment of the present disclosure.

Referring to FIG. 3 and FIG. 4, the valve core 40 can be provided with a plurality of limiting portions 41. The plurality of limiting portions 41 can be arranged along a circumference of the valve core 40. The stop rod 21 can extend through any two of the plurality of limiting portions 41 and can be configured for abutting against sidewalls of the two of the plurality of limiting portions 41 to limit circumferential movement of the valve core 40. In this way, the stop rod 21 can match with the limiting portion 41, not only rotation of the valve core 40 in an anticlockwise direction can be limited, but also rotation of the valve core 40 in an clockwise direction can be limited.

In some embodiments, the valve core 40 can be provided with three limiting portions 41. Accommodating areas 414 can be defined between any two of the three limiting portions 41 along a circumference of the valve core 40. An end of the stop rod 21 can be located in one of the accommodating areas 414, and the other end of the stop rod 21 can extend to and be located in another one of the accommodating areas 414. In this way, the stop rod can match with and limit all of the three limiting portions 41. It could be under stood that by providing three limiting portions 41, on the premise that rotation of the valve core 40 both in the clockwise direction and the anticlockwise direction can be limited, the number of the limiting portion 41 can be controlled, so that the number of the limiting portion 41 will not be too many and the limiting portion 41 will not occupy much of a volume of the valve cavity 11, and the flowing performance of the medium in the check valve 100 will not be influenced. At the same time, the limiting portion can keep the valve core 40 in balance.

Figure 5:
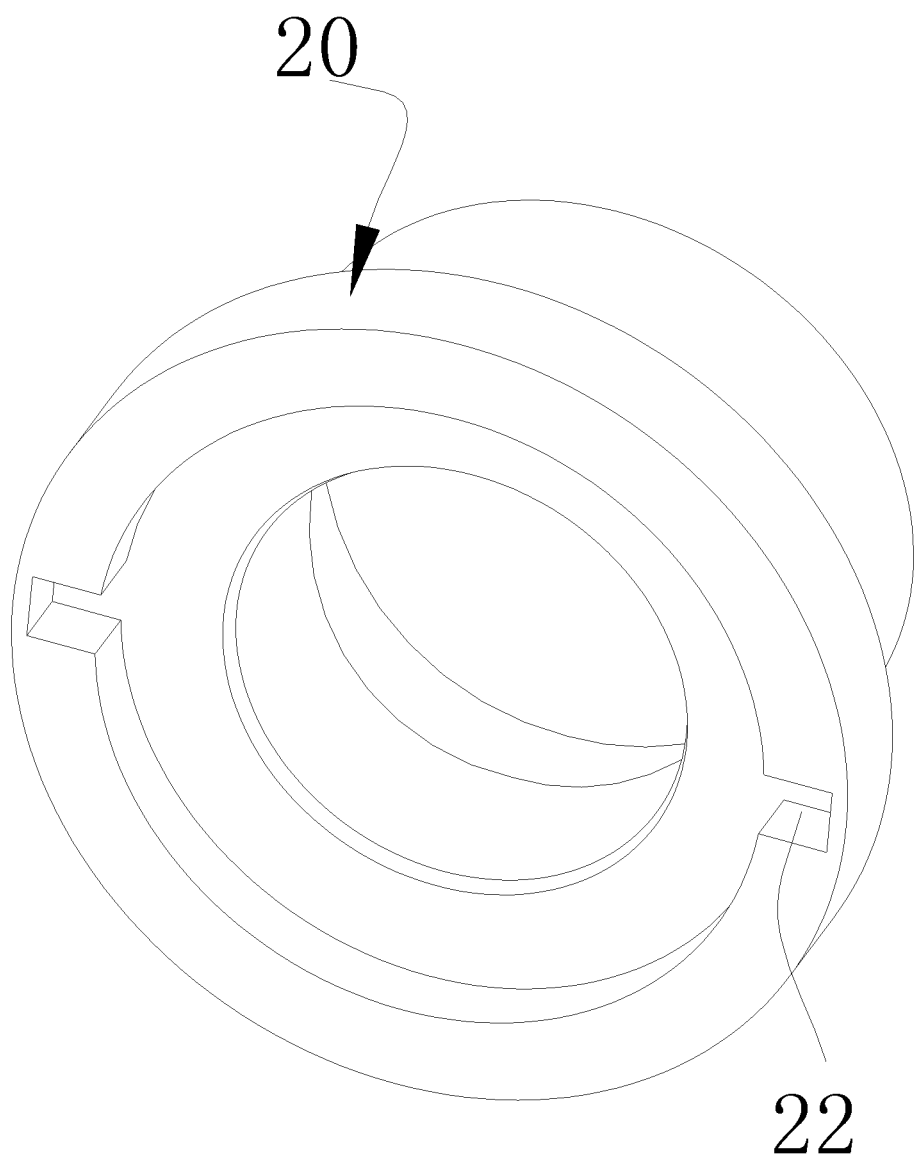
FIG. 5 is a structural schematic diagram of a valve cover in an embodiment of the present disclosure.

Referring to FIG. 5, in some embodiments, the valve cover 20 can be provided with a limiting groove 22. The stop rod 21 can be located in the limiting groove 22. An inner wall of the end of the valve body 10 adjacent to the valve cover 20 can be provided with a limiting step 15. An end surface of the valve cover 20 adjacent to the valve body 10 can abut against the limiting step 15. Since a side of the limiting groove 22 is provided with an opening, a side of the stop rod 21 can abut against the limiting step 15, so that the stop rod 21 can be fixed, and the limiting step 15 can limit the valve cover 20 at the same time.

Figure 6:
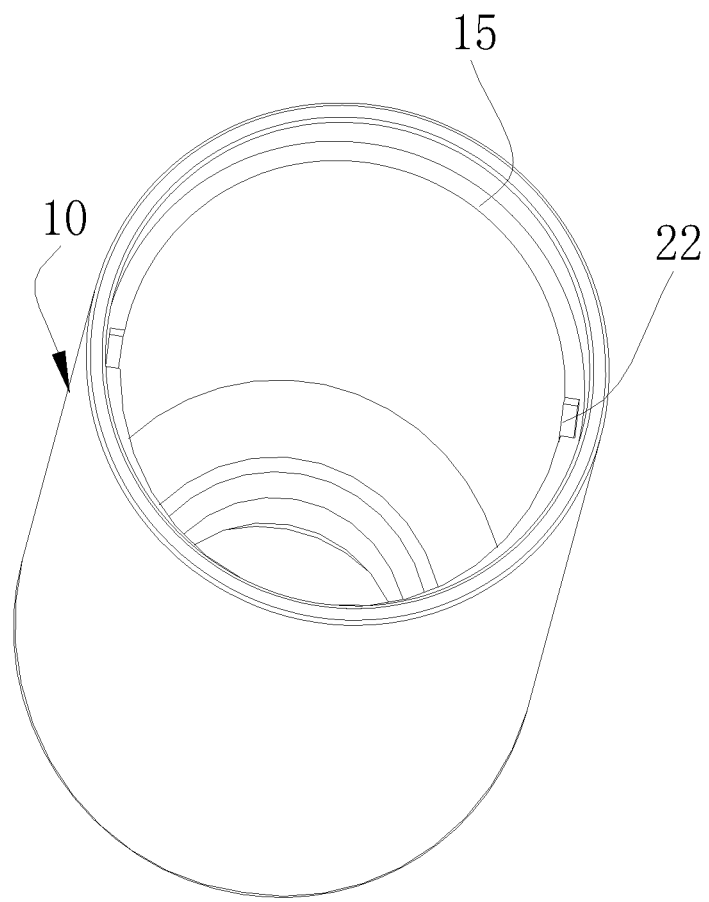
FIG. 6 is structural schematic diagram of a valve body in another embodiment of the present disclosure.
Figure 7:
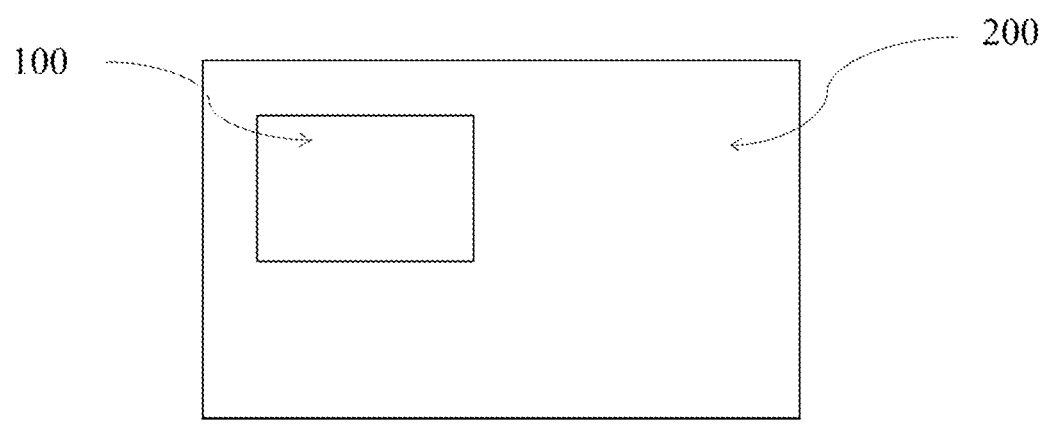
FIG. 7 is a structural schematic diagram of an air conditioner in an embodiment of the present disclosure.

Referring to FIG. 6, in some embodiments, an inner wall of the end of the valve body 10 adjacent to the valve cover 20 can be provided with a limiting step 15. The limiting step 15 can be provided with a limiting groove 22. An end surface of the valve cover 20 adjacent to the valve body 10 abuts against the limiting step 15. Since a side of the limiting groove 22 is provided with an opening, the stop rod 21 can be disposed in the limiting groove 22 and abut against an end of the valve cover 20 adjacent to the valve body 10. Therefore, the stop rod 21 can be fixed, and the limiting step 15 can limit the valve cover at the same time.

Referring to FIG. 1, an axis of the stop rod 21 can be perpendicular to an axis of the check valve 100, so that both ends of the stop rod 21 can match with and be limited by the limiting portion 41. In addition, at the same time that the stop rod 21 can match with and be limited by each of the limiting portions 41, a length of the stop rod 21 can be shortened and a mounting area can be saved.

In some embodiments, an axis of the stop rod 21 can be collinear with a center line of an end surface of the valve cover 20 adjacent to the stop rod 21. In this way, a length of the stop rod 21 can be prolonged, so that the stop rod 21 can match with each of all the limiting portions 41, thereby playing a better limiting role.

A cross section of the stop rod 21 can be circle-shaped, tetragon-shaped, or triangle-shaped.

Referring to FIG. 4, the limiting portion 41 can include a wing plate 411 and a tail plate 412. The tail plate 412 can be disposed on the wing plate 411, an end of the tail plate 412 adjacent to the valve cover 20 can protrude out from the valve core 40, so that the stop rod 21 can match with a sidewall of the tail plate 412. A second step 413 can be disposed between the tail plane 412 and the wing plate 411, an end of the tail plate 412 can abut against the inner wall of the valve cover 20, so as to limit the valve core 40 along the axis of the valve core 40. By providing the second step 413, an outer surface of the tail plate 412 can retract relative to the wing plate 411 and a diameter of an excircle of the tail plate 411 can be reduced, so that the tail plate 412 can extend in the valve cover 20. Thus, the stop rod 21 can match with a sidewall of the tail plate 412, and the valve core 40 can be limited.

A side of the limiting portion 41 can extends toward an inner wall of the valve body 10 and protrudes out from a sidewall of the valve core 40, and a flow channel 415 can be defined between adjacent two limiting portions 41, so that the medium can flow in the flow channel 415.

An end of the valve core 40 away from the stop rod 21 can be provided with a sealing surface 42. The sealing surface 42 can match with the inner wall of the valve body 10 to seal the valve port 14.

The sealing surface 42 can be a taper-shaped surface, which can define a taper-shaped sealing with the valve port 14 and improve the sealing performance.

In a process of mounting, the valve core 40 can firstly be disposed in the valve body 10. Then the stop rod 21 can be placed in the limiting groove 22 in the valve cover 20 or the limiting groove in the valve body 10, and the valve cover 20 can be covered on the valve body 10, so that the stop rod 21 can abut against the valve cover 20 or the limiting step 15.

The present disclosure further provides an air conditioner 200 (not shown) including the check valve 100 disclosed above.

When the air conditioner 200 is in operation, in a process the medium flows into the valve port 14 from the first connection pipe 12, a pressure of the medium can open the valve core 40 along a direction separating from the valve port 14. At this time, the valve port 14 can be opened. In a process the medium flows towards the second connection pipe 13, the valve core 40 can move towards a direction approach the second connection pipe 13 and rotate around an axis of the valve body 10 at the same time. Noises can be caused by collision between the valve core 40 and the valve body 10 in the moving process. When the valve core 40 moves to a position adjacent to the valve cover 20, the stop rod 21 can abut against a side wall of the limiting portion 41, and a tail plate 412 can abut against an inner wall of the valve cover 20, movement of the valve core 40 stops, and the noises can stop therewith. On the other hand, in the process the medium flows from the second connection pipe 13 to the first connection pipe 12, the valve core 40 can move towards the valve port 14 under the action of the medium until the valve port 14 is sealed. Therefore, the medium can be prevented from flowing into the first connection pipe 12, and backflow of the medium can be avoided, thereby achieving a monodirectional flow of the check valve 100.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are only several implementations of the present disclosure, and the descriptions are relatively specific and detailed, but they should not be construed as limiting the scope of the present disclosure. It should be understood by those of ordinary skill in the art that various modifications and improvements can be made without departing from the concept of the present disclosure, and all fall within the protection scope of the present disclosure. Therefore, the patent protection of the present disclosure shall be defined by the appended claims.

What is claimed is:

1. A check valve, comprising a valve body, a valve cover and a valve core,
wherein the valve body is provided with a valve cavity and a valve port, the valve core is located in the valve cavity and capable of moving in the valve cavity to open or close the valve port, and the valve cover is covered on the valve body and configured for limiting the valve core from separating from the valve cavity along an axis of the valve body;
a stop rod is provided on an end of the valve body adjacent to the valve cover,
the valve core is provided with a limiting portion, and the limiting portion is configured for matching with the stop rod to circumferentially limit the valve core;
and an inner wall of the end of the valve body adjacent to the valve cover is provided with a limiting step, the limiting step is provided with a limiting groove, the stop rod is located in the limiting groove and abuts against an end surface of the valve cover adjacent to the valve body.

2. The check valve of claim 1, wherein the valve core is provided with a plurality of limiting portions, the plurality of limiting portions are arranged along a circumference of the valve core, the stop rod extends through any two of the plurality of limiting portions and is configured for abutting against sidewalls of the two of the plurality of limiting portions.

3. The check valve of claim 1, wherein the valve core is provided with three limiting portions, accommodating areas are defined between any two of the three limiting portions along a circumference of the valve core, an end of the stop rod is located in one of the accommodating areas, and the other end of the stop rod extends to and is located in another one of the accommodating areas.

4. The check valve of claim 1, wherein an axis of the stop rod is perpendicular to an axis of the check valve.

5. The check valve of claim 1, wherein an axis of the stop rod is collinear with a center line of an end surface of the valve cover adjacent to the stop rod.

6. The check valve of claim 1, wherein the valve cover is provided with a limiting groove, an inner wall of the end of the valve body adjacent to the valve cover is provided with a limiting step, and the stop rod is located in the limiting groove and abuts against the limiting step.

7. The check valve of claim 1, wherein the limiting portion comprises a wing plate and a tail plate, the tail plate is disposed on the wing plate, an end of the tail plate adjacent to the valve cover protrudes out from the valve core, so that the stop rod is capable of matching with a sidewall of the tail plate.

8. The check valve of claim 1, wherein a side of the limiting portion extends towards an inner wall of the valve body and protrudes out from a sidewall of the valve core, and a flow channel is defined between adjacent two limiting portions.

9. The check valve of claim 1, wherein a cross section of the stop rod is circle-shaped, tetragon-shaped, or triangle-shaped.

10. An air conditioner, comprising the check valve of claim 1.

* * * * *